United States Patent
Shi et al.

(10) Patent No.: US 9,578,608 B2
(45) Date of Patent: *Feb. 21, 2017

(54) POWER SHARING METHOD AND BASE STATION

(71) Applicant: Huawei Technologies Co., Ltd., Shenzhen (CN)

(72) Inventors: Xiaoyan Shi, Shanghai (CN); Dongyu Chu, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/171,867

(22) Filed: Jun. 2, 2016

(65) Prior Publication Data

US 2016/0302161 A1  Oct. 13, 2016

Related U.S. Application Data

(63) Continuation of application No. 13/896,101, filed on May 16, 2013, now Pat. No. 9,374,792, which is a (Continued)

(30) Foreign Application Priority Data

Mar. 24, 2010 (CN) .......................... 2010 1 0132602

(51) Int. Cl.
*H04W 52/34* (2009.01)
*H04W 88/10* (2009.01)
*H04W 52/52* (2009.01)

(52) U.S. Cl.
CPC ......... *H04W 52/346* (2013.01); *H04W 52/52* (2013.01); *H04W 88/10* (2013.01)

(58) Field of Classification Search
CPC .... H04W 52/346; H04W 52/52; H04W 88/10
(Continued)

(56) References Cited

U.S. PATENT DOCUMENTS

| 6,477,388 B1 | 11/2002 | Schmutz |
| 7,706,833 B2 * | 4/2010 | Kaewell, Jr. .......... H04J 3/0685 455/255 |

(Continued)

FOREIGN PATENT DOCUMENTS

| CN | 1317182 A | 10/2001 |
| CN | 1964208 A | 5/2007 |

(Continued)

*Primary Examiner* — Sharad Rampuria
(74) *Attorney, Agent, or Firm* — Leydig, Voit & Mayer, Ltd.

(57) ABSTRACT

The embodiments of the present disclosure provide a power sharing method and a base station, wherein the method comprises the following steps of: according to a power demand of the communication systems of at least one mode among communication systems of different modes sharing a same power amplifier, determining whether to perform power sharing among communication systems of different modes (101); if it is determined to perform power sharing among communication systems of different modes, adjusting an available power of communication systems of one or more modes therein (102). According to the embodiments of the present disclosure, when it is determined to perform the power sharing according to the power demands, power sharing is performed among communication systems of different modes, thereby realizing dynamic and flexible power sharing among communication systems of at least two modes.

18 Claims, 6 Drawing Sheets

Related U.S. Application Data continuation of application No. 13/625,403, filed on Sep. 24, 2012, now Pat. No. 8,489,139, which is a continuation of application No. PCT/CN2011/072043, filed on Mar. 22, 2011.

(58) Field of Classification Search
USPC ............. 455/550.1–553.1, 522, 69, 574
See application file for complete search history.

(56) References Cited

U.S. PATENT DOCUMENTS

| | | |
|---|---|---|
| 2005/0135312 A1 | 6/2005 | Montojo et al. |
| 2005/0202839 A1 | 9/2005 | Merboth et al. |
| 2006/0192631 A1* | 8/2006 | Kearns .................. H04B 1/006 333/126 |
| 2006/0246942 A1* | 11/2006 | Ramachandran .... H04B 1/0067 455/553.1 |
| 2008/0194216 A1 | 8/2008 | Rofougaran |
| 2009/0128254 A1 | 5/2009 | Goi et al. |
| 2013/0016649 A1* | 1/2013 | Damnjanovic ....... H04W 88/04 370/315 |

FOREIGN PATENT DOCUMENTS

| | | |
|---|---|---|
| CN | 101056129 A | 10/2007 |
| CN | 101242664 A | 8/2008 |
| CN | 101378275 A | 3/2009 |
| CN | 101742624 A | 6/2010 |
| CN | 101808396 A | 8/2010 |
| EP | 2075923 A1 | 7/2009 |
| EP | 2237626 A1 | 10/2010 |
| EP | 2337233 A1 | 6/2011 |
| EP | 2541998 A1 | 1/2013 |
| WO | WO 0007318 A1 | 2/2000 |
| WO | WO 2012060750 A1 | 5/2012 |

* cited by examiner

FIG. 7 determining to perform power sharing among the communication systems of different modes, if the power demand of the communication system having a high priority among the communication systems of different modes sharing the same power amplifier exceeds a preset load threshold — 601 reducing the available power of the communication system having a low priority — 602

POWER SHARING METHOD AND BASE STATION

CROSS-REFERENCE TO RELATED APPLICATIONS

This application is a continuation of U.S. patent application Ser. No. 13/896,101, filed on May 16, 2013, which is a continuation of U.S. patent application Ser. No. 13/625,403, filed on Sep. 24, 2012, now U.S. Pat. No. 8,489,139, which is a continuation of International Patent Application No. PCT/CN2011/072043, filed on Mar. 22, 2011. The International Patent Application claims priority to Chinese Patent Application No. 201010132602.4, filed on Mar. 24, 2010. The afore-mentioned patent applications are hereby incorporated by reference in their entireties.

FIELD OF THE INVENTION

The present disclosure relates to the field of wireless communication technologies, and more specifically, relates to a power sharing method and a base station that is capable of implementing this method.

DESCRIPTION OF THE RELATED ART

G/U dual-mode base station refers to a base station that can simultaneously support both a global system for mobile communications (Global System for Mobile Communications, abbreviated as GSM) mode and a universal mobile telecommunication system (Universal Mobile Telecommunications System, abbreviated as UMTS) mode.

However, in the prior art, the maximum transmitting power configured for various carriers in the GSM mode and in the UMTS mode is fixed, which is difficult for realizing flexible power sharing.

SUMMARY OF THE INVENTION

The embodiments of the present disclosure provide a power sharing method and a base station, in order to realize dynamic and flexible power sharing among communication systems of different modes sharing a same power amplifier.

One embodiment of the present disclosure provides a power sharing method, wherein communication systems of at least two modes share the same power amplifier, the method comprises:

determining whether to perform power sharing among communication systems of different modes sharing the same power amplifier, according to a power demand of a communication system of at least one mode in the communication systems of different modes;

if it is determined to perform the power sharing among the communication systems of different modes, adjusting an available power of the communication systems of one or more modes.

Another embodiment of the present disclosure provides a base station, wherein, communication systems of at least two modes share a same power amplifier in the base station, and the base station comprises:

a share determining module for determining whether to perform power sharing among the communication systems of different modes sharing the same power amplifier, according to the power demand of the communication systems of at least one mode in the communication systems of different modes;

a power adjusting module for, if it is determined by the sharing determining module to perform power sharing among the communication systems of different modes, adjusting the available power of communication systems of one or more modes.

According to the embodiments of the present disclosure, when it is determined that power sharing needs to be performed according to the power demands, power sharing is performed among the communication systems of different modes, thereby realizing dynamic and flexible power sharing among communication systems of at least two modes.

DESCRIPTION OF THE EMBODIMENTS

In order to make the objects, the technical solutions and the advantages of the present disclosure clearer, the technical solutions provided by the present disclosure will be further described in detail, in conjunction with the accompanying drawings and taking the following embodiments as examples.

Firstly, it needs to be noted that, in the various embodiments of the present disclosure, a total carrier power that is allowed to be used can be configured in advance respectively for communication systems of each mode, such that a sum of the total power of the communication systems of each mode can be equal to a rated power of a power amplifier.

Power configuration for communication systems of various modes can take power amplifier (Power Amplifier, abbreviated as PA) as a unit and can be performed within PA. If a plurality of PAs exists, processing is performed independently within each PA by employing the solutions set forth in the embodiments of the present disclosure, or combined processing is performed among the plurality of PAs, in order to meet a larger power amplifying demand.

Figure 1:
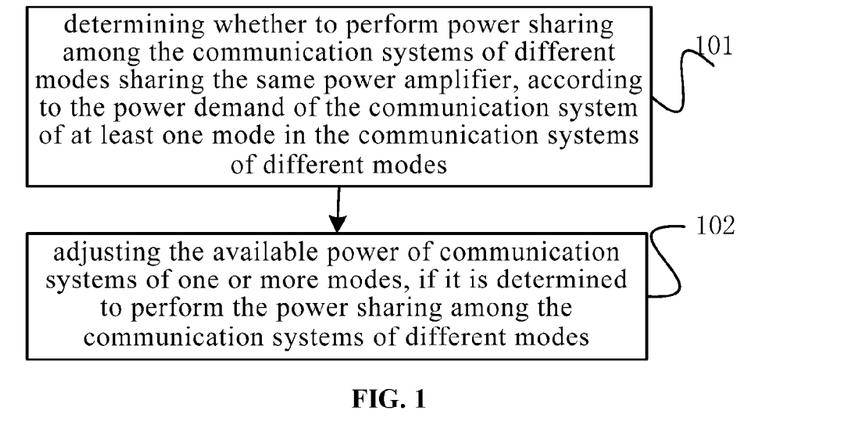
FIG. 1 is a flowchart of a power sharing method provided by one embodiment of the present disclosure.

FIG. 1 is a flowchart of a power sharing method provided by one embodiment of the present disclosure. In this embodiment, communication systems of at least two modes share a same power amplifier, for example, a communication system of GSM mode and a communication system of UMTS mode share a same power amplifier. As shown in the figure, the method comprises:

Step 101, determining whether to perform power sharing among the communication systems of different modes sharing the same power amplifier, according to the power demand of the communication systems of at least one mode in the communication systems of different modes.

For communication systems of different modes sharing the same power amplifier, according to the power demand of communication systems of one or more modes, it can be determined whether there exists remaining power for a communication system of a certain mode, such that it can determined whether power sharing is performed among the communication systems of different modes.

Step 102, if it is determined to perform the power sharing among the communication systems of different modes, adjusting the available power of communication systems of one or more modes.

If it is determined that power sharing needs to be performed among communication systems of different modes, the available power of communication systems of one or more modes can be dynamically adjusted. The particular ways for this adjusting can be various, some of which can make reference to the relevant descriptions of the subsequent embodiments.

According to the method of this embodiment, when it is determined that power sharing needs to be performed according to the power demand, power sharing is performed among communication systems of different modes, in order to realize dynamic and flexible power sharing among communication systems of at least two modes.

Additionally, it needs to be noted that, if the communication systems of at least one mode among the communication systems of different modes sharing the same power amplifier also uses other power amplifier(s) at the same time, then the above adjusting the available power of communication systems of one or more modes comprises: adjusting a proportion of the power of the shared power amplifier and the power of the other one or more power amplifiers that is consumed by the communication system which uses the other one or more power amplifiers at the same time, thereby reducing the power of the shared power amplifier that is consumed by the communication system which uses other one or more power amplifiers at the same time.

Wherein, various ways can be adopted for adjusting a proportion of the power of the shared power amplifier and the power of the other one or more power amplifiers that is consumed by the communication system which uses other one or more power amplifiers at the same time, so long as it can reduce the power of the shared power amplifier that is consumed by the communication system which uses other one or more power amplifiers at the same time. For example, it is assumed that the UMTS and the GSM share a first power amplifier but the GSM also uses a second power amplifier at the same time, then a proportion of the power of the first power amplifier and the second power amplifier that is consumed by the GSM can be adjusted, in order to reduce the power of the first power amplifier that is consumed by the GSM. Because the total power required by the GSM is fixed, when the GSM consumes more power of the second power amplifier, the power of the first power amplifier that is consumed by the GSM will become less, such that it is possible to make the power of the first power amplifier be consumed by the UMTS as much as possible. One of the ways is preferentially assigning the power of the second power amplifier to the GSM as its available power. It is noted that, demands vary with different configurations, sometimes the power of the two power amplifiers should be used evenly. For example, in MIMO (Multiple Input Multiple Output) scenario, the GSM can be caused to use the power of the first power amplifier and the second power amplifier as evenly as possible. Wherein, a distribution set or other manners can be adopted for sharing power from the GSM to the UMTS.

Figure 2:
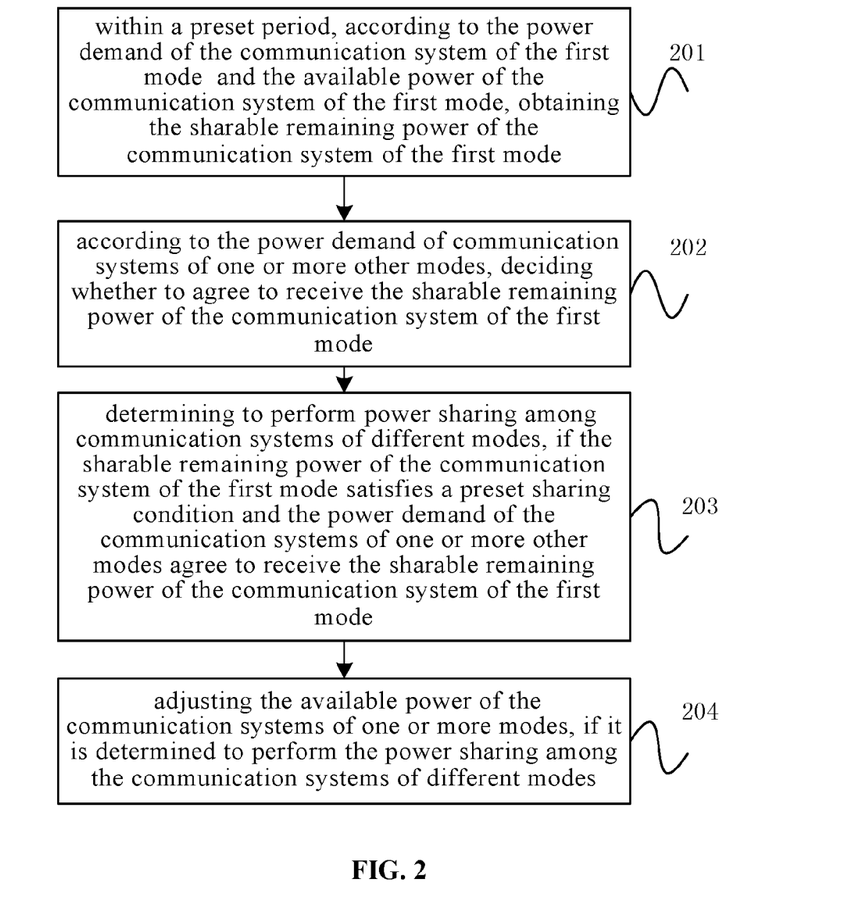
FIG. 2 is a flowchart of a power sharing method provided by another embodiment of the present disclosure.

FIG. 2 is a flowchart of a power sharing method provided by another embodiment of the present disclosure. In this embodiment, communication systems of different modes sharing the same power amplifier are referred to as a communication system of a first mode and communication systems of one or more other modes. As shown in the figure, the method comprises:

Step 201, within a preset period, according to the power demand of the communication system of the first mode and the available power of the communication system of the first mode, obtaining the sharable remaining power of the communication system of the first mode.

In particular, the sharable remaining power of the communication systems of each mode can be obtained in the following ways.

When the preset period arrives, the current power demand is subtracted from the total power currently configured for a communication system of one mode, and the obtained difference is the sharable remaining power; or, when the preset period arrives, the current power demand and the preserved power are subtracted from the available power currently configured for the communication system of one mode, and the obtained difference is the sharable remaining power; or, a fixed power value or a fixed proportion in the total power currently configured for the communication system of one mode can serve as the sharable remaining power.

Wherein, the current power demand refers to the power required by the communication system of one mode for maintaining the current operation. For example, the current power demand of the GSM mode refers to the maximum value among the sums of the power required by each time slot of the current eight time slots, including pilot transmitting power. In the time division multiple access (Time Division Multiple Access, abbreviated as TDMA) technology, a frame consists of eight time slots. The GSM pilot transmitting power refers to the power consumed at the time of transmitting pilot signals in the Broadcast Control Channel (abbreviated as BCCH). Since a pilot signal generally has a function of providing forward code division multiple access channel time limit, coherent demodulation phase reference, or the like, it is a very important signal whose transmitting power needs to be kept unchanged, such that this pilot signal will not be regarded as the sharable remaining power for being used by communication systems of other modes.

Wherein, the preserved power refers to an idle power preserved for being used by one mode, in case for the arrival of predictable burst traffic or being used for meeting power demand of the communication system of this mode in the next preset period. This preserved power can be set as any arbitrary numerical value as needed.

It needs to be noted that, the preset period herein can be set as needed. The above-mentioned communication system of the first mode can be any one of the communication systems of different modes sharing the same power amplifier.

Step 202, according to the power demand of communication systems of one or more other modes, deciding whether to agree to receive the sharable remaining power of the communication system of the first mode.

Specifically, if the network load of the communication systems of one or more other modes (such as the High Speed Downlink Packet Access (abbreviated as HSDPA) network load) is relatively light, when it is unnecessary to receive the shared power, it is refused to receive the remaining power. Alternatively, if the remaining time during which this remaining power can be shared is less than the minimum valid time (in a unit of ms) during which this remaining power can be used by the communication systems of one or more other modes, it is also refused to receive the shared power, in order to avoid excessively short use time of the shared power and low utilization after performing power sharing. Wherein, the remaining time refers to, within a sharing period, a period of time from determining to share the remaining power with the communication systems of one or more other modes for use till the end of this sharing period.

Step 203, if the sharable remaining power of the communication system of the first mode satisfies a preset sharing condition and the power demand of the communication systems of one or more other modes agree to receive the sharable remaining power of the communication system of the first mode, determining to perform power sharing among communication systems of different modes.

Specifically, if the sharable remaining power of the communication system of the first mode is larger than or equal to a first threshold, it is determined that the sharable remaining power of the communication system of the first mode satisfies the preset sharing condition; alternatively, if a difference between the sharable remaining power of the communication system of the first mode and the sharable remaining power of the communication systems of one or more other modes is larger than or equal to a second threshold, it is determined that the sharable remaining power of the communication system of the first mode satisfies the preset sharing condition. Of course, according to different demands, other ways also can be employed for determining whether the sharable remaining power of the communication system of the first mode satisfies the preset sharing condition, and details thereof are omitted. In addition, if the sharable remaining power of the communication system of the first mode does not satisfy the preset sharing condition, it can be re-determined whether the sharable remaining power of the communication system of another mode satisfies the preset sharing condition; if the sharable remaining power of this communication system of another mode satisfies the preset sharing condition, the power of this communication system can be shared to communication systems of other modes.

For example, it is assumed that the communication system of the first mode is GSM, if the remaining power of the GSM is larger than or equal to the first threshold, it indicates that the power demand of the GSM mode at this time point is relatively low and a portion of the remaining power of the GSM can be shared to other modes; otherwise, it indicates that the power demand of the GSM mode itself at this time point is also very high, and it is not appropriate to share power with other modes, for avoiding the normal operation of the GSM mode itself from being affected.

Again, for example, it is assumed that the communication system of the first mode is GSM and the communication systems of one other mode is UMTS, if the GSM mode has already shared power to the UMTS mode during the previous period, only when a difference between the sharable remaining power of the GSM communication system and the sharable remaining power of the UMTS is larger than or equal to the second threshold can the sharing condition be satisfied, such that it is ensured that only when the GSM has enough remaining power it shares power with the UMTS, thereby avoiding power retrieving operation and repeated power sharing operations from being performed frequently, reducing the burden of the system. In addition to the GSM and the UMTS, there are communication systems of other modes, for example, the Long Term Evolution (abbreviated as LTE). However, regardless the modes of the communication systems, the processing are similar and thus this embodiment will not describe all of them.

It needs to be noted that, the above description has been made taking a situation in which the GSM shares the power to the UMTS as an example. However, in practical situations, it is also possible that the UMTS shares the power to the GSM. The numerical values of the first threshold and the second threshold can be set according to actual needs, and the embodiments of the present disclosure will not make any limitations on it.

In addition, if the communication system of the first mode is GSM, it further comprises, before obtaining the sharable remaining power of the communication system of the first mode in the above-mentioned step 201, deciding whether the number of non-primary B carriers in the GSM carriers reaches a preset numerical value, if it reaches the preset numerical value, performing the step of obtaining the sharable remaining power of the communication system of the first mode; wherein, the preset numerical value can be any arbitrary positive integer, the primary B carrier refers to a carrier that transmits pilot signals while the non-primary B carrier refers to the carriers other than the primary B carriers. In the GSM, in order to guarantee its normal operation, sufficient power will be assigned to the primary B carriers, which thus may consume a huge amount of available power. When the number of the non-primary B carriers is sufficiently high, a great amount of remaining power may be shared to communication systems of one or more other modes, and then the number of the non-primary B carriers can be decided in advance at the time of deciding whether there has remaining power for sharing. If the number of the non-primary B carriers does not reach the preset numerical value, the subsequent decision can be avoided.

Step 204, if it is determined to perform the power sharing among communication systems of different modes, the available power of communication systems of one or more modes is adjusted.

If it is determined that power sharing needs to be performed among communication systems of different modes, the available power of the communication systems of one or more modes can be dynamically adjusted. The particular ways for this adjusting are various, some of which can make reference to the relevant descriptions in the subsequent embodiments.

Figure 3:
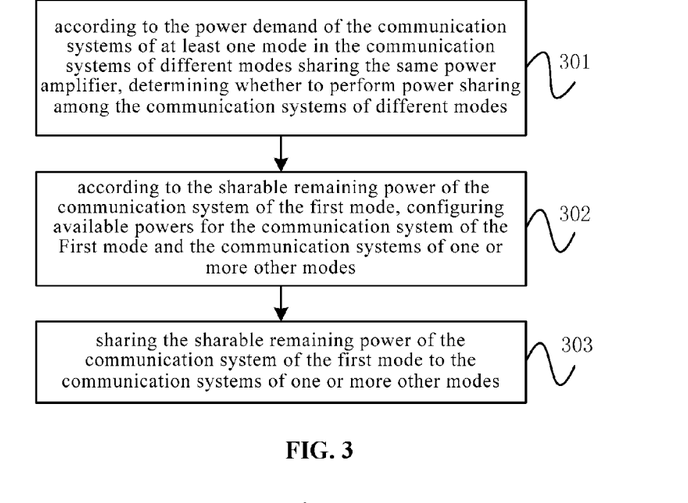
FIG. 3 is a flowchart of a power sharing method provided by a further embodiment of the present disclosure.

FIG. 3 is a flowchart of a power sharing method provided by another embodiment of the present disclosure. As shown in the figure, it comprises:

Step 301, according to the power demand of the communication systems of at least one mode among the communication systems of different modes sharing the same power amplifier, determining whether to perform power sharing among the communication systems of different modes.

The implementation of this step can make reference to the relevant descriptions in FIG. 1 or FIG. 2, and thus details thereof will be omitted.

Step 302, according to the sharable remaining power of the communication system of the first mode, configuring available power for the communication system of the first mode and communication systems of one or more other modes.

For example, a difference obtained by subtracting the sharable remaining power from the total power currently configured for the communication system of the first mode can serve as the available power to be configured for the communication system of the first mode; and then, on the basis of the power currently configured for the one or more other modes, the sharable remaining power is assigned to the communication systems of one or more other modes according to a preset rule.

Specifically, assigning the sharable remaining power to the communication systems of one or more other modes according to a preset rule can go as follows: if there are multiple communication systems of other modes, assigning the sharable remaining power to the multiple communication systems of other modes in an order of time (for example, at 12:00, assigning the sharable remaining power to the UMTS for sharing; at 15:00, assigning the sharable remaining power to the LTE for sharing); or, according to the priorities of the multiple communication systems of other modes, assigning the sharable remaining power to the multiple communication systems of other modes in an order from a high priority to a low priority; or, assigning the sharable remaining power evenly to the multiple communication systems of other modes. Wherein, the priority can be determined according to the performances of the communication systems, for example, a high priority is provided for a communication system of a mode to which a problem of insufficient power tends to occur, in order to obtain sharing power preferentially; or the priority can be determined according to the inclinations of the operator, for example, if the operator wishes to preferentially guarantee the normal operation of the UMTS, then a high priority is provided for this UMTS system; or, the priority can be determined according to the power demands of the communication systems of these modes, the higher the power demand, the higher the priority that will be provided.

Step 303, sharing the sharable remaining power of the communication system of the first mode to the communication systems of one or more other modes.

For example, it is assumed that the communication system of the first mode is GSM, and the communication system of one other mode is UMTS. In particular, the available power of the UMTS after obtaining the shared power is equal to a sum of the available power of the UMTS before obtaining the shared power and the shared power that is agreed to be received. Wherein, the shared power that is agreed to be received is a portion of power that the UMTS agrees to receive from the sharable remaining power of the GSM system. Further, the shared power received from the GSM mode can be used for the HSDPA network in the UMTS mode, wherein, the HSDPA network utilizes the power obtained by sharing from the GSM mode. Because the more the power there are, the more the available modulation code in the code division multiple access modulation manner and the more content is carried, it is possible to enhance the downlink data transmission rate for cell users.

Additionally, it is noted that, if an absolute value of a difference between the sharable remaining power of the communication system of the first mode obtained when the current preset period arrives and the sharable remaining power obtained when the previous preset period arrives is less than or equal to a third threshold, the available power of the communication systems of different modes can be kept unchanged; otherwise, according to the sharable remaining power of the communication system of the first mode, available power are configured for the communication system of the first mode and the communication systems of one or more other modes. Thus, when the remaining power of the communication system of the first mode changes greatly, shared power is provided to the communication systems of one or more other modes; while, when the remaining power of the communication system of the first mode changes slightly, it is not meaningful to re-perform power sharing, which avoids the configuration of available power from being frequently performed which in turn may add the burden of the system. The above-mentioned third threshold can be set according to actual needs as well.

The above embodiment provides a solution in which the communication system of the first mode provides a long-term power sharing to communication systems of other modes, after the communication system of the first mode has performed power sharing with the communication systems of one or more other modes, the communication system of the first mode may have burst traffic, or, it is predicted that the available power of the communication system of the first mode cannot satisfy the power demand of the communication system of the first mode during the next preset period, power retrieving can be performed. A situation in which burst traffic occurs will be taken as an example for the following description.

Below, descriptions are made taking a situation in which the GSM and the UMTS share the same power amplifier as an example, in which, it is assumed that the communication system of the first mode is GSM.

Figure 4:
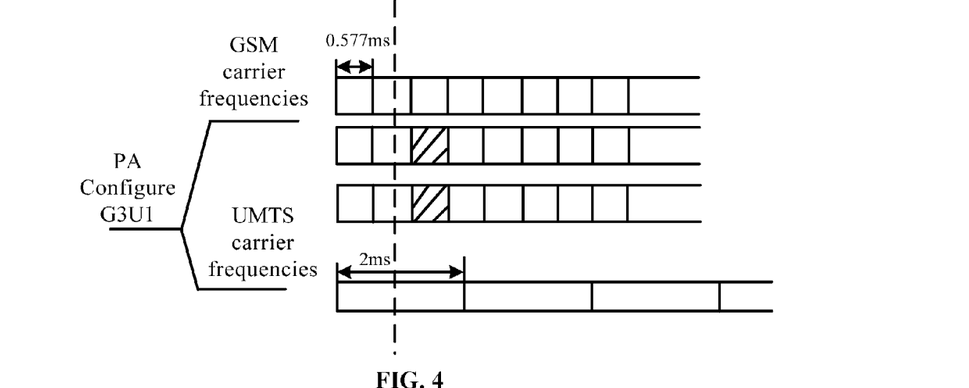
FIG. 4 is a diagram showing a frame structure when GSM has burst traffic after the power sharing method provided by the embodiments of the present disclosure is performed.

As shown in FIG. 4, it is assumed that the GSM has provided power sharing to the UMTS, PA has configured three GSM carrier frequencies and one UMTS carrier frequency (represented as "G3U1" in FIG. 4), wherein, the dotted line position represents that burst traffic having a power demand of 20 W occurs to the GSM carrier frequency at this time point, when the power demanded by this burst traffic exceeds the available idle power of the GSM mode remaining after the GSM mode has provided shared power to the UMTS mode, the current GSM remaining available power cannot satisfy the demand of this burst traffic, and it is necessary at this time point to retrieve the power that has been shared to the UMTS mode in-time. The hatched portion in FIG. 4 indicates performing a uniform peak clipping on the carrier frequency in a time slot assigned by the burst traffic, in order to ensure that the total power demand does not exceed the rated power of the PA at the GSM side and meanwhile power are retrieved back to the UMTS side. Thus, another embodiment of the present disclosure further provides the following power sharing method.

Figure 5:
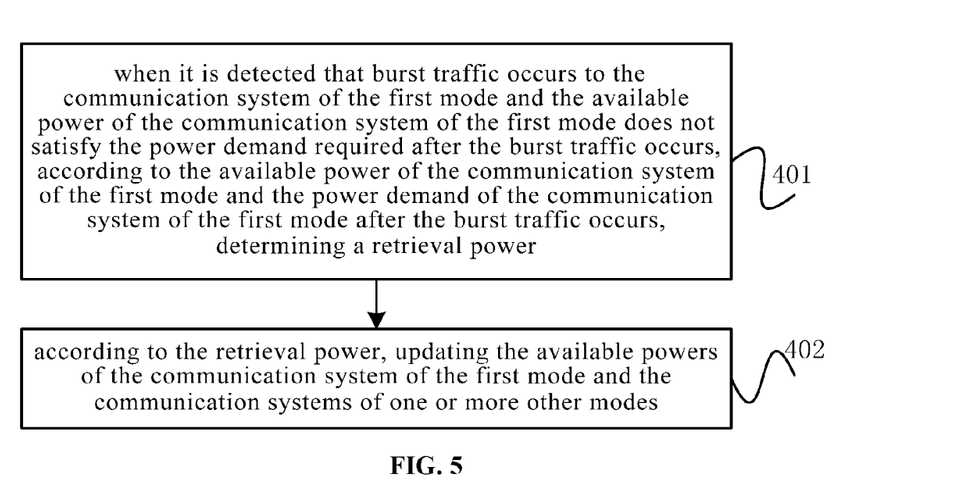
FIG. 5 is a flowchart of a power sharing method provided by another embodiment of the present disclosure.

FIG. 5 is a flowchart of a power sharing method provided by another embodiment of the present disclosure. As shown in the figure, after performing power sharing, it further comprises, Step 401, when it is detected that burst traffic occurs to the communication system of the first mode and the available power of the communication system of the first mode does not satisfy the power demand required after the burst traffic occurs, it is determined to retrieval power, according to the available power of the communication system of the first mode and the power demand of the communication system of the first mode after the burst traffic occurs.

For example, it is assumed that the communication system of the first mode is UMTS, and the power demand of this UMTS during the next preset period is equal to a sum of the UMTS current power demand, the power demand at the time of transmitting HSDPA data during the next preset period, and the UMTS current remaining power.

Step 402, according to the retrieval power, updating the available power of the communication system of the first mode and the communication systems of one or more other modes.

Specifically, the available power of the communication system of the first mode after updating is equal to a sum of the available power of the communication system of the first mode before updating and the retrieval power. After completing the updating, power amplification is performed by the power amplifier based on the updated available power of the various systems.

With the method described in this embodiment, when the communication system of the first mode has a busy traffic, the shared power that is shared from the communication system of the first mode to the communication system of the second mode can be retrieved dynamically, which thus further improves the flexibility of power sharing and at the most extent avoids posing adverse influences for the performance of the communication system of the first mode.

Additionally, it needs to be noted that, since the above process of power retrieving has a certain time delay, PA overloading may occur before completing power retrieving. Thus, before performing the above step 402, the following step can be performed: according to a difference between the power demand of the communication system of the first mode and the available power of the communication system of the first mode, reducing the available power of the communication system of the first mode.

For example, it is assumed that the communication system of the first mode is GSM. Particularly, calculation can be performed based on the following formula: GSM peak clipping power=GSM power demand−GSM available power.

Wherein, the GSM peak clipping power refers to the power to be reduced from the GSM available power. The GSM power demand comprises: the power demand (including transmitting power required by the pilot signal) before the arrival of the above burst traffic and the power required by the above burst traffic.

Then, according to the calculated GSM peak clipping power, peak clipping processing is performed on the business carrier configured under the GSM. The particular peak clipping processing can perform uniform peak clipping on each business carrier according to the number of the business carriers configured under the GSM. Each business carrier peak clipping power=GSM peak clipping power/the number of the GSM business carriers. Wherein, the business carrier refers to the carriers in the BCCH It needs to be noted that, the above descriptions are made by taking a situation in which burst traffic occurs as an example. It is understood that, when it is predicated that the available power of the communication system of the first mode does not satisfy the power demand of the communication system of the first mode during the next preset period, a similar processing can be used. In such scene, the retrieval power can be determined according to the power demand within the next preset period and the available power of the communication system of the first mode.

Figure 6:
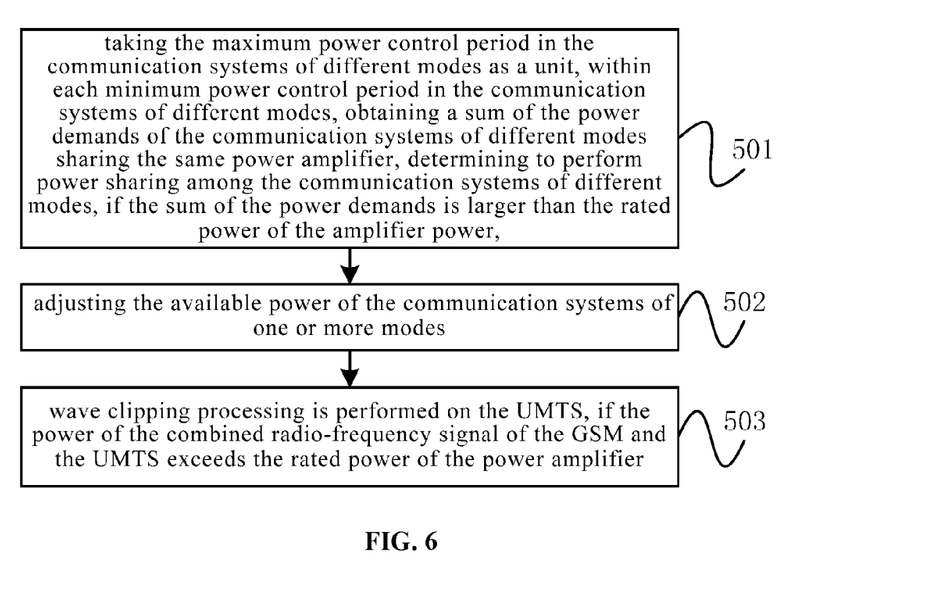
FIG. 6 is a flowchart of a power sharing method provided by another embodiment of the present disclosure.

FIG. 6 is a flowchart of a power sharing method provided by another embodiment of the present disclosure. As shown in the figure, the method comprises:

Step 501, taking the maximum power control period in the communication systems of different modes as a unit, within each minimum power control period in the communication systems of different modes, obtaining a sum of the power demands of the communication systems of different modes sharing the same power amplifier, wherein, if the sum of the power demands is larger than the rated power of the power amplifier, it is determined to perform power sharing among communication systems of different modes.

Figure 7:
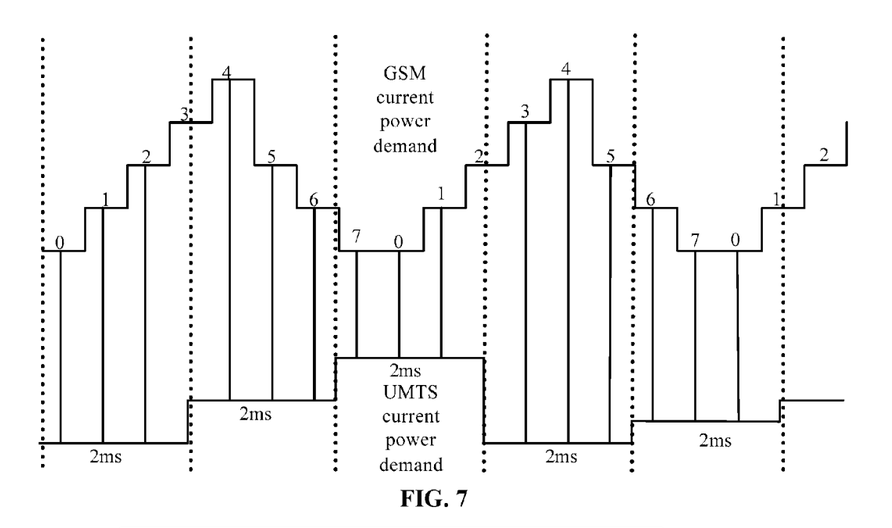
FIG. 7 is a diagram showing power demand timing of the GSM and the UMTS in the method shown in FIG. 6.

For example, it is assumed that a communication system of one mode is GSM and the communication system of another mode is UMTS. As shown in FIG. 7, it is a diagram showing the power demand timings of the GSM and the UMTS, the numbers "0", e1" . . . "7" in the figure indicate the numbers of the eight time slots within one TDMA frame. As shown in the figure, herein, a length (such as, 2 ms) of one time slot of the UMTS can be understood as the maximum power control period, while a length of the one time slot of the GSM can be understood as the minimum power control period. For example, within a first 2 ms time slot of the UMTS, a sum of the power demands of the GSM and the UMTS are obtained within the time slots of the GSM that are numbered as "0", "1" and "2". If the obtained sum of the power demands is larger than the rated power of the power amplifier, it is determined that power sharing needs to be performed between the GSM and the UMTS.

Step 502, adjusting the available power of the communication systems of one or more modes.

For example, it is assumed that a communication system of one mode is GSM and the communication system of another mode is UMTS. The specific procedure goes as follows:

(1) If the GSM current power demand exceeds the GSM available power while the UMTS current power demand does not exceed the UMTS available power, peak clipping processing is performed on the GSM, and the GSM peak clipping power=the GSM current power demand+the UMTS current power demand−the rated power of the power amplifier.

Wherein, performing peak clipping processing on the GSM means reducing the average transmitting power. "GSM current power demand+UMTS current power demand" represents a total power demand of the GSM and the UMTS. A portion of this total power demand that exceeds the PA rated power is used as the GSM peak clipping power for performing peak clipping processing on the GSM, in order to guarantee the power demand of the UMTS.

(2) If the GSM current power demand does not exceed the GSM available power while the UMTS current power demand exceeds the UMTS available power, peak clipping processing will not be performed in the GSM mode.

(3) If the GSM current power demand exceeds the GSM available power and the UMTS current power demand also exceeds the UMTS available power, peak clipping processing is performed on the GSM, and GSM peak clipping power=GSM current power demand−GSM available power.

Since the GSM current power exceeds the GSM available power, the exceeding portion is used as the GSM peak clipping power for performing peak clipping on the GSM.

When the above communication systems of different modes sharing the same power amplifier are the GSM and the UMTS, this embodiment can further comprise the following steps:

Step 503, if the power of the combined radio-frequency signal of the GSM and the UMTS exceeds the rated power of the power amplifier, wave clipping processing is performed on the UMTS.

For example, after performing peak clipping processing on the GSM in step 502, the combined radio-frequency signal of the GSM and the UMTS still has a power that may exceed the rated power of the power amplifier, and thus this step is employed for performing wave clipping processing on the UMTS, wherein, the wave clipping processing means reducing peak-to-average ratio.

With the method described in this embodiment, based on the power control period in the communication systems of different modes, an instantaneous power sharing is realized, thereby realizing dynamic and flexible power sharing among communication systems of at least two modes.

Figure 8:
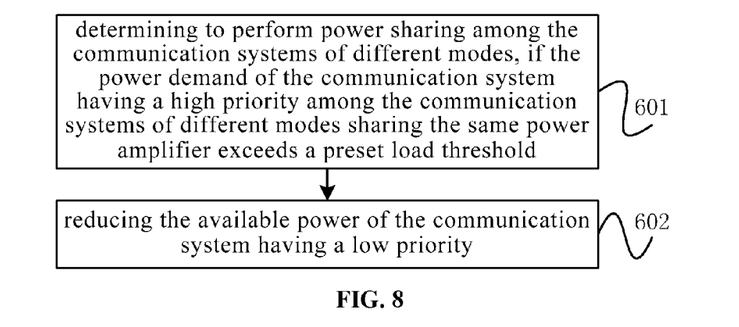
FIG. 8 is a flowchart of a power sharing method provided by another embodiment of the present disclosure.

FIG. 8 is a flowchart of a power sharing method provided by another embodiment of the present disclosure. As shown in the figure, the method comprises:

Step 601, if the power demand of the communication system having a high priority among the communication systems of different modes sharing the same power amplifier exceeds a preset load threshold, it is determined to perform power sharing among communication systems of different modes.

Wherein, the priority can be determined according to the performances of the communication systems, for example, a high priority is provided for a communication system of a mode to which a problem of insufficient power tends to occur, in order to preferentially obtain shared power; or the priority can be determined according to the inclinations of the operator, for example, if the operator wishes to preferentially guarantee the normal operation of the UMTS, then a high priority is provided for this UMTS system; or, the priority can be determined according to the power demands of the communication systems of these modes, the higher the power demand, the higher the priority that will be provided. Of course, the priority of the communication systems can be determined by other ways, and this embodiment will not make any limitations on it.

Step 602, reducing the available power of the communication system having a low priority.

According to the method described in this embodiment, when the power demand of the communication system having a high priority among the communication systems of different modes sharing the same power amplifier exceeds the preset load threshold, it is determined to perform power sharing among communication systems of different modes, and the available power of the communication system having a low priority is reduced, thereby facilitating that the communication system having a high priority can be guaranteed to have sufficient available power.

Figure 9:
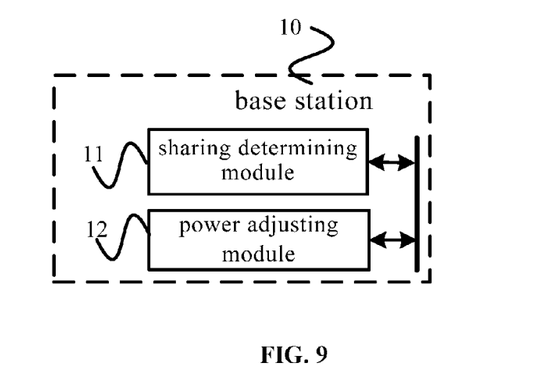
FIG. 9 is a structural diagram showing a base station provided by one embodiment of the present disclosure.

FIG. 9 is a diagram showing the structure of the base station provided by one embodiment of the present disclosure. As shown in the figure, in this base station 10, communication systems of at least two modes share the same power amplifier in the base station. This base station can include a share determining module 11 and a power adjusting module 12, wherein the share determining module 11 in the base station 10 determines whether to perform power sharing among communication systems of different modes sharing the same power amplifier according to the power demand of communication systems of at least one modes in the communication systems of different modes; when the share determining module 11 determines to perform power sharing among communication systems of different modes, the power adjusting module 12 adjusts the available power of the communication systems of one or more modes.

If it is determined that power sharing needs to be performed among communication systems of different modes, the available power of communication systems of one or more modes can be dynamically adjusted. The specific ways for this adjusting can be various, some of which can make reference to the relevant descriptions of the above method embodiments.

In the base station of this embodiment, when it is determined to perform power sharing according to power demand, power sharing is performed among communication systems of different modes, thereby realizing dynamic and flexible power sharing among communication systems of at least two modes.

Additionally, it needs to be noted that, if the communication systems of at least one mode among the communication systems of different modes sharing the same power amplifier also uses other power amplifier at the same time, the above power adjusting module 12 can adjust a proportion of the power of the shared power amplifier and the power of the other one or more power amplifiers that is consumed by the communication system which uses the other one or more power amplifiers at the same time, thereby reducing the power of the shared power amplifier that is consumed by the communication system which uses other one or more power amplifiers at the same time. Reference can be made to the relevant contents in the above method embodiments, and thus details thereof are omitted.

Figure 10:
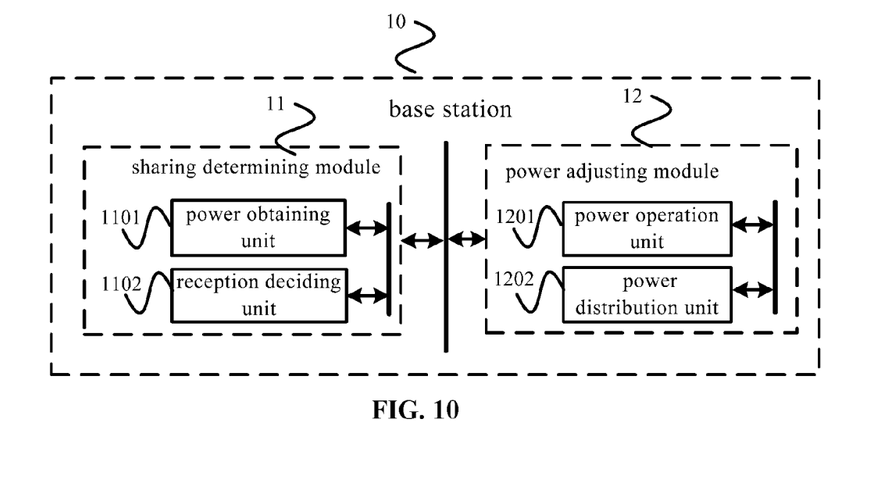
FIG. 10 is a structural diagram showing a base station provided by another embodiment of the present disclosure.

FIG. 10 is a diagram showing the structure of a base station provided by another embodiment of the present disclosure. As shown in the figure, the share determining module 11 in the base station of this embodiment can comprise: a power obtaining unit 1101 and a reception deciding unit 1102; further, the power adjusting module 12 can comprise a power operation unit 1201 and a power distribution unit 1202. Wherein the power obtaining unit 1101 obtains, within a preset period, according to the power demand of the communication system of the first mode and the available power of the communication system of the first mode, the sharable remaining power of the communication system of the first mode. Specifically, the sharable remaining power of the communication systems of different modes can be obtained in the following ways.

When the preset period arrives, the current power demand is subtracted from the total power currently configured for a communication system of one mode, and the obtained difference is the sharable remaining power; or, when the preset period arrives, the current power demand and the preserved power are subtracted from the available power currently configured for a communication system of one mode, and the obtained difference is the sharable remaining power; or, a fixed power value or a fixed proportion in the total power currently configured for a communication system of one mode can serve as the sharable remaining power.

Wherein, the current power demand refers to the power required by a communication system of one mode for maintaining the current operation. The preserved power refers to an idle power preserved for being used by one mode, in case for the arrival of predictable burst traffic. This preserved power can be set as any arbitrary numerical value as needed. It needs to be noted that, the preset period herein can be set as needed. The above-mentioned communication system of the first mode can be any one of the communication systems of different modes sharing the same power amplifier.

The reception deciding unit 1102 decides, according to the power demand of the communication systems of one or more other modes, whether to agree to receive the sharable remaining power of the communication system of the first mode. If the sharable remaining power of the communication system of the first mode satisfies the preset sharing condition and the communication systems of one or more other modes agree to receive the sharable remaining power of the communication system of the first mode, it is determined to perform power sharing among communication systems of different modes.

Wherein, the reception deciding unit 1102 can decide, according to network load of the communication systems of one or more other modes or the remaining time during which the remaining power can be shared, whether to agree to receive the sharable remaining power of the communication system of the first mode. Specifically, if the network load of the communication systems of one or more modes (such as the HSDPA network load) is relatively light, and when it is unnecessary to receive the shared power, it is refused to receive the remaining power. Alternatively, if the remaining time during which this remaining power can be shared is less than the minimum valid time (in a unit of ms) during which this remaining power can be used by the communication systems of one or more other modes, it is also refused to receive the shared power, in order to avoid excessively short use time of the shared power and low utilization after performing power sharing. Wherein, the remaining time refers to, within a sharing period, a period of time from determining to share the remaining power to the communication systems of one or more other modes till the end of this sharing period.

When the share determining module 11 determines to perform power sharing among communication systems of different modes, the power operation unit in the power adjusting module 12 can use a difference obtained by subtracting the sharable remaining power from the total power currently configured for the communication system of the first mode as the available power configured for the communication system of the first mode; and then, the power distribution unit 1202 assigns, on the basis of the power currently configured for the one or more other modes, the sharable remaining power to the communication systems of one or more other modes according to a preset rule.

Specifically, assigning the sharable remaining power to the communication systems of one or more other modes according to a preset rule can go as follows: if there are multiple communication systems of other modes, assigning the sharable remaining power to the multiple communication systems of other modes in an order of time; or, according to the priorities of the multiple communication systems of other modes, assigning the sharable remaining power to the multiple communication systems of other modes in an order from a high priority to a low priority; or, assigning the sharable remaining power evenly to the multiple communication systems of other modes. Wherein, the priority can be determined according to the performances of the communication systems, for example, a high priority is provided for a communication system of a mode to which a problem of insufficient power tend to occur, in order to obtain the shared power preferentially; or the priority can be determined according to the inclinations of the operator, for example, if the operator wishes to preferentially guarantee the normal operation of the UMTS, a high priority is provided for this UMTS system; or, the priority can be determined according to the power demands of communication systems of these modes, the higher the power demand is, the higher priority will be provided.

In addition, after the communication system of the first mode has performed power sharing with the communication systems of one or more other modes, the communication system of the first mode may have burst traffic, reference can be made to FIG. 4 and its relevant descriptions for details of the burst traffic, and thus details thereof are omitted; or, it is predicted that the available power of the communication system of the first mode cannot satisfy the power demand of the communication system of the first mode during the next preset period; at this time point, power retrieving can be performed.

Figure 11:
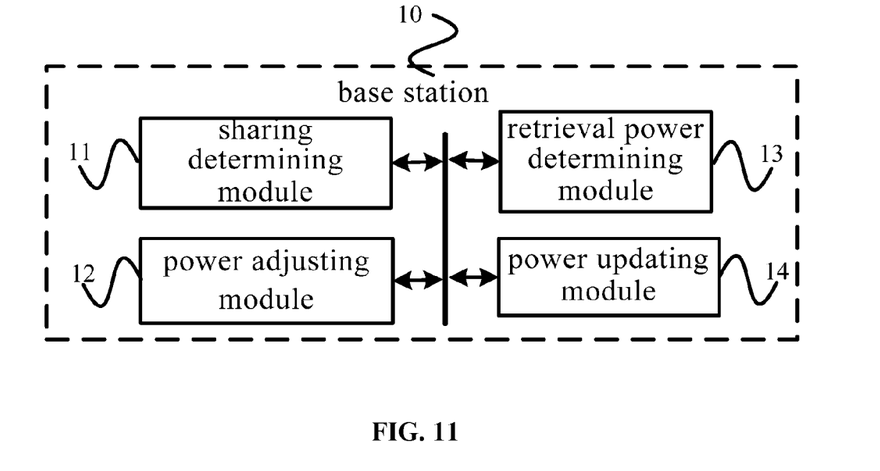
FIG. 11 is a structural diagram showing a base station provided by a further embodiment of the present disclosure.

Another embodiment of the present disclosure also provides another base station. FIG. 11 is a diagram showing the structure of a base station provided by another embodiment of the present disclosure. As shown in the figure, the base station 10 also comprises: a retrieval power determining module 13 and a power updating module 14, wherein:

When it is detected that burst traffic occurs to the communication system of the first mode and the available power of the communication system of the first mode does not satisfy the power demand required after the burst traffic occurs, the retrieval power determining module 13 determines the retrieval power according to the available power of the communication system of the first mode and the power demand of the communication system of the first mode after the burst traffic occurs; or, when it is predicated that the available power of the communication system of the first mode cannot satisfy the power demand of the communication system of the first mode during the next preset period, the retrieval power determining module 13 determines the retrieval power according to the power demand within the next preset period and the available power of the communication system of the first mode; the power updating module 14 updates the available power of the communication system of the first mode and the communication systems of one or more modes according to the retrieval power determined by the retrieval power determining module.

Specifically, the available power of the communication system of the first mode after updating=the available power of the communication system of the first mode before updating+the retrieval power.

With this embodiment, when the communication system of the first mode has a busy traffic, the shared power that is shared from the communication system of the first mode to the communication system of the second mode can be taken back dynamically, which thus further improves the flexibility of power sharing and to the maximum extent avoids posing adverse influences on the performance of the communication system of the first mode.

Figure 12:
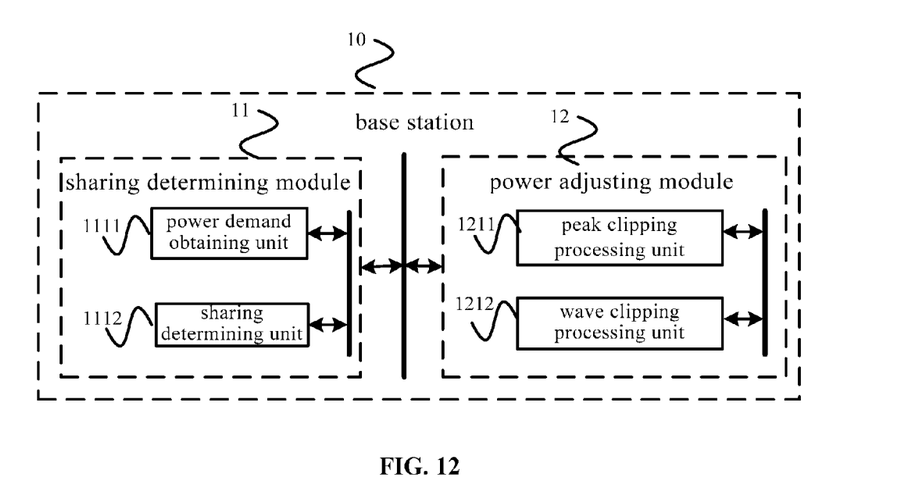
FIG. 12 is a structural diagram showing a base station provided by a further another embodiment of the present disclosure.

FIG. 12 is a diagram showing the structure of a base station provided by another embodiment of the present disclosure. As shown in the figure, the share determining module 11 in the base station 10 comprises: a power demand obtaining unit 1111 and a share determining unit 1112; the power adjusting module 12 comprises: a peak clipping processing unit 1211 and a wave clipping processing unit 1212, wherein:

The power demand obtaining unit 1111 takes the maximum power control period in the communication systems of different modes as a unit, within each minimum power control period in the communication systems of different modes, obtains a sum of the power demands of the communication systems of different modes sharing the same power amplifier; if the sum of the power demands is larger than the rated power of the power amplifier, the share determining unit 1112 determines to perform power sharing among communication systems of different modes. It is assumed that a communication system of one mode is GSM and the communication system of another mode is UMTS. Reference can be made to FIG. 7 and its relevant description for details of the power demand timing of the GSM and the UMTS, and thus details thereof are omitted.

Hereinafter, if the GSM current power demand exceeds the GSM available power while the UMTS current power demand does not exceed the UMTS available power, peak clipping processing is performed on the GSM by the peak clipping processing unit 1211, and the GSM peak clipping power=the GSM current power demand+the UMTS current power demand−the rated power of the power amplifier; and/or, if the GSM current power demand exceeds the GSM available power and the UMTS current power demand also exceeds the UMTS available power, peak clipping processing is performed on the GSM, and GSM peak clipping power=GSM current power demand−GSM available power. Since the GSM current power exceeds the GSM available power, the exceeding portion is used as the GSM peak clipping power for performing peak clipping on the GSM. Additionally, if the GSM current power demand does not exceed the GSM available power while the UMTS current power demand exceeds the UMTS available power, peak clipping processing will not be performed in the GSM mode.

After the peak clipping unit performs peak clipping processing, if the power of the combined radio-frequency signal of the GSM and the UMTS exceeds the rated power of the power amplifier, wave clipping processing is performed on the UMTS by the wave clipping processing unit 1212.

For example, after performing peak clipping processing on the GSM in step 502, the combined radio-frequency signal of the GSM and the UMTS still has a power that may exceed the rated power of the power amplifier, and thus this step is employed for performing wave clipping processing on the UMTS, wherein, the wave clipping processing means reducing peak-to-average ratio.

With this embodiment, based on the power control period in the communication systems of different modes, an instantaneous power sharing is realized, thereby realizing dynamic and flexible power sharing among communication systems of at least two modes.

Figure 13:
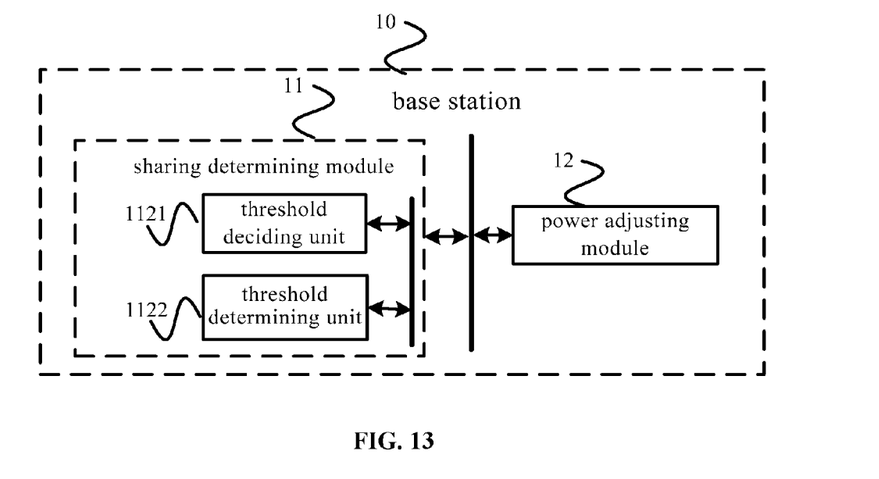
FIG. 13 is a structural diagram showing a base station provided by another embodiment of the present disclosure.

FIG. 13 is a diagram showing the structure of a base station provided by another embodiment of the present disclosure. As shown in the figure, the share determining module 11 in the base station 10 comprises: a threshold deciding unit 1121 and a threshold determining unit 1122, wherein:

The threshold deciding unit 1121 decides if the power demand of the communication system having a high priority among the communication systems of different modes sharing the same power amplifier exceeds a preset load threshold. Wherein, the priority can be determined according to the performances of the communication systems. For example, a high priority is provided for a communication system of a mode to which a problem of insufficient power tends to occur, in order to preferentially obtain the shared power; or the priority can be determined according to the inclinations of the operator, for example, if the operator wishes to preferentially guarantee the normal operation of the UMTS, then a high priority is provided for this UMTS system; or, the priority can be determined according to the power demands of the communication systems of these modes, the higher the power demand is, the higher priority will be provided.

If the threshold deciding unit 1121 decides that the power demand of the communication system having a high priority exceeds the preset load threshold, the threshold determining unit 1122 determines to perform power sharing among communication systems of different modes.

Hereinafter, when the threshold determining unit 1122 determines to perform power sharing among communication systems of different modes, the available power of the communication system having a low priority is reduced by the power adjusting module 12.

According to the base station described in this embodiment, when the power demand of the communication system having a high priority among the communication systems of different modes sharing the same power amplifier exceeds the preset load threshold, it is determined to perform power sharing among communication systems of different modes, and the available power of the communication system having a low priority is reduced, thereby facilitating that the communication system having a high priority can be guaranteed to have sufficient available power.

It needs to be noted that, the base station described in the embodiments of FIG. 9 to FIG. 13 can be a microcellular base station (MBTS).

One of ordinary skill in the art can understand that, all or part of the steps for implementing the above method embodiments can be implemented through program instruction related hardware. The program can be stored in a computer readable access storage medium, which executes the steps of the above method embodiments when being executed; the above mentioned storage medium comprises various media that can store program codes, such as, ROM, RAM, magnetic disk or optical disk.

Finally, it should be noted that, the above embodiments are merely for describing the technical solutions of the present disclosure, but are not intended to limit the technical solutions of the present disclosure. Although the present disclosure has been described in detail with reference to the above embodiments, one of ordinary skill in the art should understand that, the technical solutions recited in the above embodiments can be modified, or some of the technical features thereof can be equivalently replaced. These modifications and replacements will not cause the relevant technical solutions to depart from the spirit and scope of the technical solutions of the embodiments.

What is claimed is:

1. A power sharing method, wherein communication systems of at least two modes share a same power amplifier, the method comprises:
    determining, by a base station, to perform power sharing among communication systems of different modes, in response to a power demand of a communication system of one mode among the communication systems of different modes which are sharing a same power amplifier in the base station;
    and performing power sharing among communication systems of at least two modes in response to a situation that performs power sharing among the communication systems of different modes being determined;
    wherein the communication systems of at least two modes comprise at least two of the following: global system for mobile communications, universal mobile telecommunications system and long term evolution.

2. The method according to claim 1, wherein the step of performing power sharing comprises: sharing sharable remaining power of a communication system of a first mode to a communication system of other modes among the different modes.

3. The method according to claim 2, wherein the step of performing power sharing further comprises:
configuring available power for the communication system of the first mode and the communication systems of one or more other modes according to the sharable remaining power of the communication system of the first mode, in order to share the sharable remaining power of the communication system of the first mode to the communication systems of one or more other modes.

4. The method according to claim 3, wherein the step of configuring available power for the communication system of the first mode and the communication systems of one or more other modes according to the sharable remaining power of the communication system of the first mode comprises:
subtracting the sharable remaining power from the total power currently configured for the communication system of the first mode, and using a difference obtained thereby as an available power of said communication system of the first mode; and
on a basis of the power currently configured for the communication systems of one or more other modes, assigning the sharable remaining power to the communication systems of one or more other modes according to a preset rule.

5. The method according to claim 2, wherein the sharable remaining power of a communication system of the first mode is determined in the following manner:
obtaining the sharable remaining power of a communication system of a first mode, according to a power demand of said the communication system of the first mode and an available power of the communication system of the first mode.

6. The method according to claim 2, wherein the step of determining whether to perform power sharing among communication systems of different modes sharing a same power amplifier according to a power demand of the communication systems of at least one mode among communication systems of different modes, comprises:
deciding whether to agree to receive the sharable remaining power of the communication system of the first mode, according to a power demand of the communication systems of one or more other modes; and
determining to perform power sharing among the communication systems of different modes, if the sharable remaining power of the communication system of the first mode satisfies a preset sharing condition and the communication systems of one or more other modes agree to receive the sharable remaining power of the communication system of the first mode.

7. The method according to claim 2, wherein the method further comprises:
when it is detected that burst traffic arrives at the communication system of the first mode and the available power of the communication system of the first mode does not satisfy the power demand required after the burst traffic arrives, determining retrieval power, according to the power demand of the communication system of the first mode required after the burst traffic arrives and the available power of the communication system of the first mode.

8. The method according to claim 2, wherein the method further comprises: when it is predicted that the available power of the communication system of the first mode does not satisfy the power demand of the communication system of the first mode within a next preset period, determining retrieval power, according to the power demand within the next preset period and the available power of said communication system of the first mode.

9. The method according to claim 1, wherein the step of determining whether to perform power sharing among communication systems of different modes sharing a same power amplifier according to a power demand of the communication systems of at least one mode among communication systems of different modes, comprises: if a power demand of a communication system having a high priority in the communication systems of different modes sharing the same power amplifier exceeds a preset load threshold, determining to perform power sharing among the communication systems of different modes.

10. A base station comprising a processor, wherein communication systems of at least two modes share a same power amplifier in the base station and the processor is configured to execute instructions to cause the base station to perform following:
in response to a power demand of the communication systems of at least one mode among communication systems of different modes which are sharing a same power amplifier, determine whether to perform power sharing among communication systems of different modes; and
perform power sharing among communication systems of at least two modes in response to situation that perform power sharing among the communication systems of different modes is determined;
wherein the communication systems of at least two modes comprises at least two of the following: global system for mobile communications, universal mobile telecommunications system and long term evolution.

11. The base station according to claim 10, wherein the processor is configured to execute instructions to cause the base station to perform power sharing among the communication systems of at least two modes by sharing sharable remaining power of a communication system of a first mode to a communication system of other modes among the different modes.

12. The base station according to claim 11, wherein the processor is further configured to execute instructions to cause the base station to configure available power for the communication system of the first mode and the communication systems of one or more other modes according to the sharable remaining power of the communication system of the first mode, in order to share the sharable remaining power of the communication system of the first mode to the communication systems of one or more other modes.

13. The base station according to claim 11, wherein the processor is configured to execute instructions to cause the base station to configure available power for the communication system of the first mode and the communication systems of one or more other modes in the following manner: subtracting the sharable remaining power from the total power currently configured for the communication system of the first mode, and using a difference obtained thereby as an available power of said communication system of the first mode; and on basis of the power currently configured for the communication systems of one or more other modes, assigning the sharable remaining power to the communication systems of one or more other modes according to a preset rule.

14. The base station according to claim 11, wherein the processor is configured to execute instructions to cause the base station to obtain the sharable remaining power of a communication system of a first mode according to a power demand of said the communication system of the first mode and an available power of said the communication system of the first mode.

15. The base station according to claim 11, wherein the processor is configured to execute instructions to cause the base station to determine whether to perform power sharing among communication systems of different modes sharing a same power amplifier according to a power demand of the communication systems of at least one mode among communication systems of different modes in the following manner:

deciding whether to agree to receive the sharable remaining power of the communication system of the first mode, according to a power demand of the communication systems of one or more other modes; and determining to perform power sharing among the communication systems of different modes, if the sharable remaining power of the communication system of the first mode satisfies a preset sharing condition and the communication systems of one or more other modes agree to receive the sharable remaining power of the communication system of the first mode.

16. The base station according to claim 11, wherein the processor is further configured to execute instructions to cause the base station to:

when it is detected that burst traffic arrives at said communication system of the first mode and the available power of the communication system of the first mode does not satisfy the power demand required after said burst traffic arrives, determine retrieval power, according to the power demand of the communication system of the first mode required after the burst traffic arrives and the available power of the communication system of the first mode.

17. The base station according to claim 11, wherein the processor is further configured to execute instructions to cause the base station to:

when it is predicted that the available power of the communication system of the first mode does not satisfy the power demand of the communication system of the first mode within a next preset period, determining retrieval power, according to the power demand within the next preset period and the available power of the communication system of the first mode.

18. The base station according to claim 10, wherein the processor is configured to execute instructions to cause the base station to determine to perform power sharing among the communication systems of different modes if a power demand of a communication system having a high priority in the communication systems of different modes sharing the same power amplifier exceeds a preset load threshold.

* * * * *